（12）United States Patent
Gomi et al.

(10) Patent No.: US 7,792,384 B2
(45) Date of Patent: Sep. 7, 2010

(54) IMAGE PROCESSING APPARATUS, IMAGE PROCESSING METHOD, PROGRAM, AND RECORDING MEDIUM THEREFOR

(75) Inventors: Shinichiro Gomi, Chiba (JP); Masami Ogata, Kanagawa (JP)

(73) Assignee: Sony Corporation (JP)

( * ) Notice: Subject to any disclaimer, the term of this patent is extended or adjusted under 35 U.S.C. 154(b) by 782 days.

(21) Appl. No.: 11/352,150

(22) Filed: Feb. 10, 2006

(65) Prior Publication Data

US 2006/0291741 A1 Dec. 28, 2006

(30) Foreign Application Priority Data

Feb. 10, 2005 (JP) ............................. 2005-034161

(51) Int. Cl.
G06K 9/40 (2006.01)
G06K 9/38 (2006.01)

(52) U.S. Cl. ...................... 382/266; 382/270; 382/263; 382/264; 382/261

(58) Field of Classification Search ....................... None
See application file for complete search history.

(56) References Cited

U.S. PATENT DOCUMENTS

| | | | | |
|---|---|---|---|---|
| 5,245,432 A | * | 9/1993 | Jaffray et al. | 348/578 |
| 5,930,007 A | * | 7/1999 | Kojima | 358/464 |
| 6,175,659 B1 | * | 1/2001 | Huang | 382/266 |
| 6,337,925 B1 | * | 1/2002 | Cohen et al. | 382/199 |
| 6,445,832 B1 | * | 9/2002 | Lee et al. | 382/266 |
| 6,643,406 B1 | * | 11/2003 | Hajjahmad et al. | 382/240 |
| 6,735,341 B1 | * | 5/2004 | Horie et al. | 382/239 |
| 6,775,031 B1 | * | 8/2004 | Fujiwara | 358/2.1 |
| 7,148,924 B2 | * | 12/2006 | Hiroshige et al. | 348/252 |
| 7,386,158 B2 | * | 6/2008 | Yamada | 382/132 |
| 7,616,240 B2 | * | 11/2009 | Hiroshige et al. | 348/252 |
| 2003/0185420 A1 | * | 10/2003 | Sefcik et al. | 382/103 |
| 2004/0105015 A1 | * | 6/2004 | Tsukioka | 348/222.1 |
| 2004/0183812 A1 | * | 9/2004 | Raskar et al. | 345/582 |
| 2004/0190787 A1 | * | 9/2004 | Nakami | 382/260 |

FOREIGN PATENT DOCUMENTS

| | | |
|---|---|---|
| JP | 07-193716 A | 7/1995 |
| JP | 2002-133410 A | 5/2002 |
| JP | 2003-224715 A | 8/2003 |

* cited by examiner

*Primary Examiner*—Vikkram Bali
*Assistant Examiner*—Michelle Entezari
(74) *Attorney, Agent, or Firm*—Lerner, David, Littenberg, Krumholz & Mentlik, LLP

(57) ABSTRACT

An image processing apparatus for processing input-image data to output output-image data. The apparatus includes a plurality of image processing units operable to detect an edge-gradient direction having a largest gradient of a pixel value and an edge direction orthogonal to the edge-gradient direction for each pixel of the input-image data, to perform edge-enhancement processing on the input-image data in the edge-gradient direction, and to perform smoothing processing on the input-image data in the edge direction; and an integration unit operable to integrate the image data output from the plurality of image processing units to generate the output-image data. The plurality of image processing units have different characteristics set for use with detecting the edge-gradient direction and the edge direction.

16 Claims, 10 Drawing Sheets

IMAGE PROCESSING APPARATUS, IMAGE PROCESSING METHOD, PROGRAM, AND RECORDING MEDIUM THEREFOR

CROSS-REFERENCE TO RELATED APPLICATIONS

The present application claims priority from Japanese Patent Application No. JP 2005-034161 filed on Feb. 10, 2005, the disclosure of which is hereby incorporated by reference herein.

BACKGROUND OF THE INVENTION

The present invention relates to an image processing apparatus, an image processing method, a program of the image processing method, and a recording medium recording the program of the image processing method. The present invention can be applied to, for example, a resolution transformation. In the present invention, edge-enhancement processing and smoothing processing are performed in an edge-gradient direction having a largest gradient of a pixel value and an edge direction orthogonal to the edge-gradient direction, respectively, in order to improve image quality. Also, the edge-gradient direction and the edge direction are detected by different characteristics, the edge-enhancement processing and the smoothing processing are performed for each characteristic, and then the processing result of each characteristic is integrated. Thus, the loss of high frequency components and the occurrence of jaggy are prevented in order to reliably improve the image quality.

To date, in image processing, a resolution has been transformed, for example by linear interpolation processing, bicubic transformation processing. For example, Japanese Unexamined Patent Application Publication No. 2003-224715 has proposed a method of performing such image processing by a simple configuration.

However, in such image processing, there has been a problem in that jaggy occurs in edge portions, and if the characteristic for the linear interpolation processing and the characteristic of bicubic transformation processing are set so as to hide the jaggy, high frequency components are lost from that image to make the image lacking sharpness and blurred. In this regard, such blurring in an image is remarkable in a texture portion, and thus the characteristic of such processing is considered to be changed in the texture portion. However, in this case, a sense of dissimilarity and a flicker occur at the portion changing those characteristics.

SUMMARY OF THE INVENTION

The present invention has been made in consideration of the above-described points. It is desirable to propose an image processing apparatus, an image processing method, a program of the image processing method, and a recording medium recorded with the program of the image processing method, which are capable of preventing the loss of high frequency components and the occurrence of jaggy in order to reliably improve image quality.

According to an embodiment of the present invention, there is provided an image processing apparatus for processing input-image data to output output-image data, the apparatus including a plurality of image processing units operable to detect an edge-gradient direction having a largest gradient of a pixel value and an edge direction orthogonal to the edge-gradient direction for each pixel of the input-image data, to perform edge-enhancement processing on the input-image data in the edge-gradient direction, and to perform smoothing processing on the input-image data in the edge direction and an integration unit operable to integrate the image data output from the plurality of image processing units to generate the output-image data, wherein the plurality of image processing units have different characteristics set for use with detecting the edge-gradient direction and the edge direction.

Also, according to an embodiment of the present invention, there is provided a method of processing input-image data to output output-image data, the method including performing a plurality of image processings including detecting an edge-gradient direction having a largest gradient of a pixel value and an edge direction orthogonal to the edge-gradient direction for each pixel of the input-image data, performing edge-enhancement processing on the input-image data in the edge-gradient direction, and performing smoothing processing on the input-image data in the edge direction to produce processed image data; and integrating the processed image data to generate the output-image data, wherein the plurality of image processings have different characteristics set for use with detecting the edge-gradient direction and the edge direction.

Also, according to an embodiment of the present invention, there is provided a program executable by a processor to perform a method for processing input-image data to output output-image data, the method including performing a plurality of image processings including detecting an edge-gradient direction having a largest gradient of a pixel value and an edge direction orthogonal to the edge-gradient direction for each pixel of the input-image data, performing edge-enhancement processing on the input-image data in the edge-gradient direction, and performing smoothing processing on the input-image data in the edge direction to produce processed image data; and integrating the processed image data to generate the output-image data, wherein the plurality of image processings have different characteristics set for use with detecting the edge-gradient direction and the edge direction.

Also, according to an embodiment of the present invention, there is provided a recording medium recorded with a program executable by a processor to perform a method for processing input-image data to output output-image data, the method including performing a plurality of image processings including detecting an edge-gradient direction having a largest gradient of a pixel value and an edge direction orthogonal to the edge-gradient direction for each pixel of the input-image data, performing edge-enhancement processing on the input-image data in the edge-gradient direction, and performing smoothing processing on the input-image data in the edge direction to produce processed image data; and integrating the processed image data to generate the output-image data, wherein the plurality of image processings have different characteristics set for use with detecting the edge-gradient direction and the edge direction.

With the configuration of an embodiment of the present invention, an image processing apparatus, which processes input-image data to output output-image data, includes a plurality of image processing units operable to detect an edge-gradient direction having a largest gradient of a pixel value and an edge direction orthogonal to the edge-gradient direction for each pixel of the input-image data, to perform edge-enhancement processing on the input-image data in the edge-gradient direction, and to perform smoothing processing on the input-image data in the edge direction; and an integration unit operable to integrate the image data output from the plurality of image processing units to generate the output-image data. Thus, it is possible to prevent the loss of high frequency components and the occurrence of jaggy in order to improve image quality. Also, when the plurality of image processing units have different characteristics set for use with detecting in the edge-gradient direction and the edge direction, if it is difficult to detect the edge direction and the edge-gradient direction in one image processing unit, a detection error occurs, or the like, and the other image processing units can correctly detect the edge direction and the edge-gradient direction, and thus the image quality can be reliably improved.

Accordingly, with the configurations of embodiments of the present invention, it is possible to provide an image processing method, a program for performing the image processing method, and a recording medium recorded with the program for performing the image processing method, which are capable of preventing the loss of high frequency components and the occurrence of jaggy in order to reliably improve image quality.

According to the present invention, it is possible to prevent the loss of high frequency components and the occurrence of jaggy in order to reliably improve image quality.

DETAILED DESCRIPTION

In the following, a detailed description will be given of an embodiment of the present invention with reference to the drawings.

First Embodiment

Configuration of the Embodiment

Figure 1:
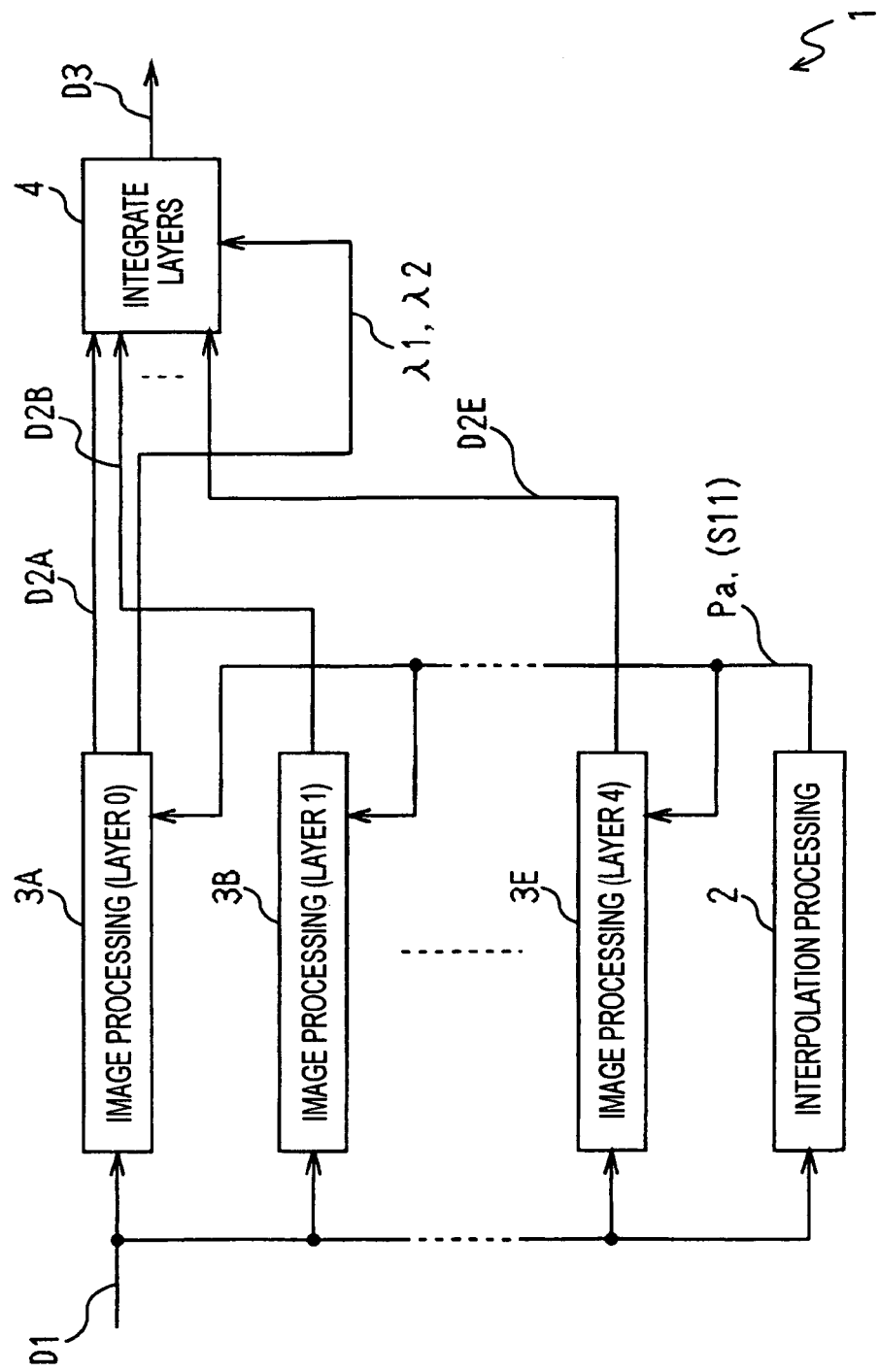
FIG. 1 is a functional block diagram illustrating the configuration of an image processing apparatus according to an embodiment of the present invention.

FIG. 1 is a functional block diagram illustrating an image processing apparatus according to a first embodiment of the present invention. The image processing apparatus 1 is formed by, for example a digital signal processor, which is processing means. The processing means performs a predetermined processing program, and thereby transforms the resolution of the image data D1, which is input-image data, into the resolution specified by a controller, not shown, to output the data. Thus, the image processing apparatus 1 generates output-image data D3, which has been enlarged or contracted from the image data D1, and outputs the data to display means, etc.

In this regard, the processing program for the processing means is provided by being pre-installed in the image processing apparatus in this embodiment. However, such a processing program may be provided, for example, by being downloaded through a network such as the Internet, or the like. Furthermore, the processing program may be provided through various recording media. In this regard, various recording media, such as an optical disc, a memory card, a removable hard disk, etc., can be widely used for such recording media.

In the image processing apparatus 1, an interpolation processing unit 2 transforms the resolution of the image data D1 by, for example linear interpolation processing, bicubic transformation processing to output a pixel value Pa with the sampling pitch corresponding to the output-image data D3.

Image processing units 3A to 3E detect an edge-gradient direction having a largest gradient of each pixel value and an edge direction orthogonal to the edge-gradient direction for each pixel of the input-image data D1, and performs edge-enhancement processing and smoothing processing on the input-image data in the edge-gradient direction and the edge direction, respectively, in order to transform the resolution of the image data D1 to the resolution of the output-image data D3. The image processing units 3A to 3E integrate the result of the resolution transformation by a series of processing with image data S11 by the pixel value Pa output from the interpolation processing unit 2 to output the processing result as image data D2A to D2E. Thus, excessive contour-enhancement in a natural image is effectively avoided.

The image processing units 3A to 3E have the same configuration with the exception of having different characteristics for the detection of the edge-gradient direction and the edge direction.

A layer integration unit 4 integrates the processing results of the plurality of the image processing units 3A to 3E to output the output-image data D3. Thus, the image processing apparatus 1 integrates the processing results by various characteristics to generate the output-image data D3. Accordingly, the image processing apparatus 1 reliably prevents the loss of high frequency components and the occurrence of jaggy, and transforms the resolution of the image data D1 even in the case of displaying a specific pattern, etc.

Figure 2:
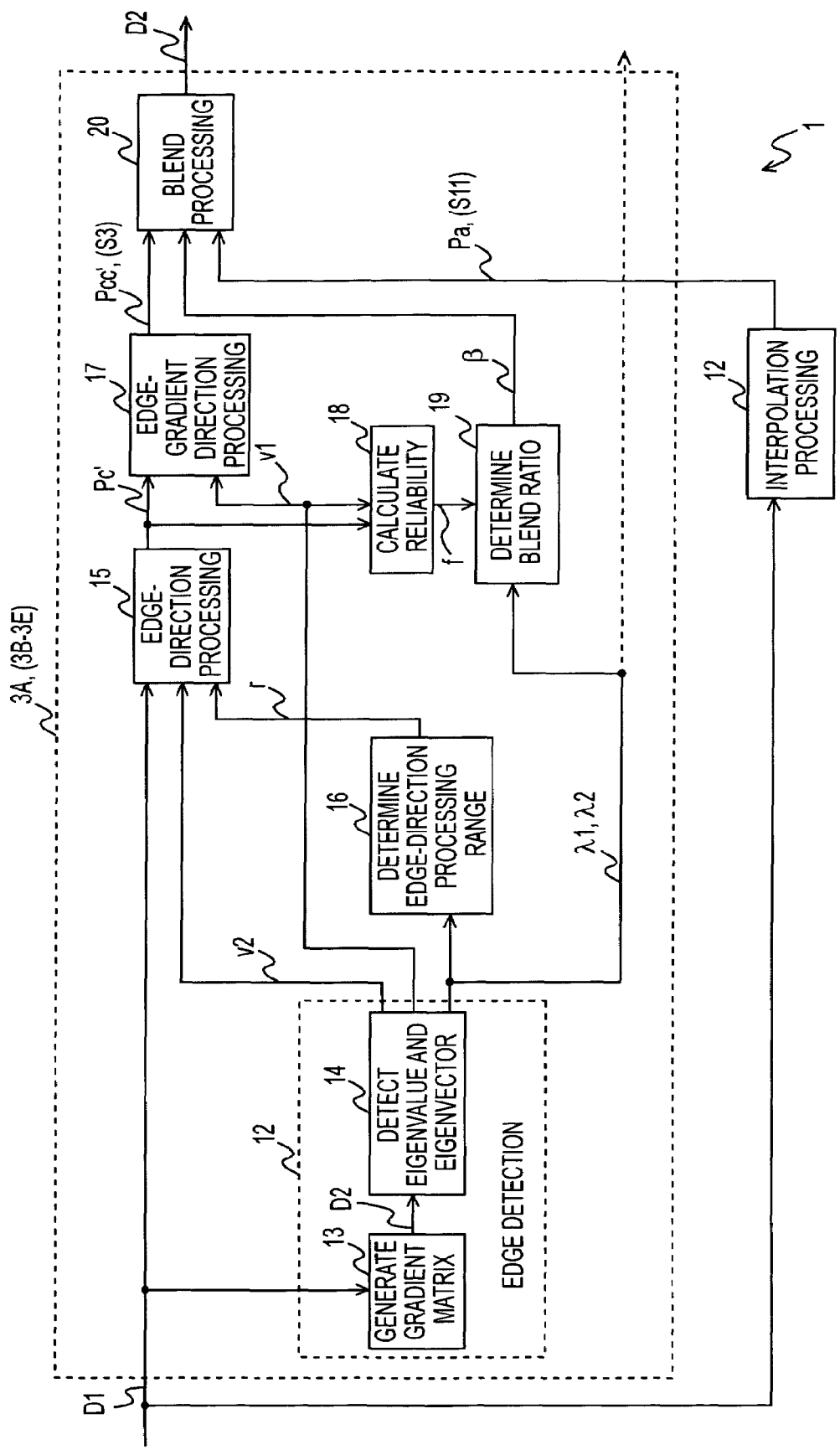
FIG. 2 is a functional block diagram illustrating an image processing unit according to the image processing apparatus in FIG. 1.
Figure 3:
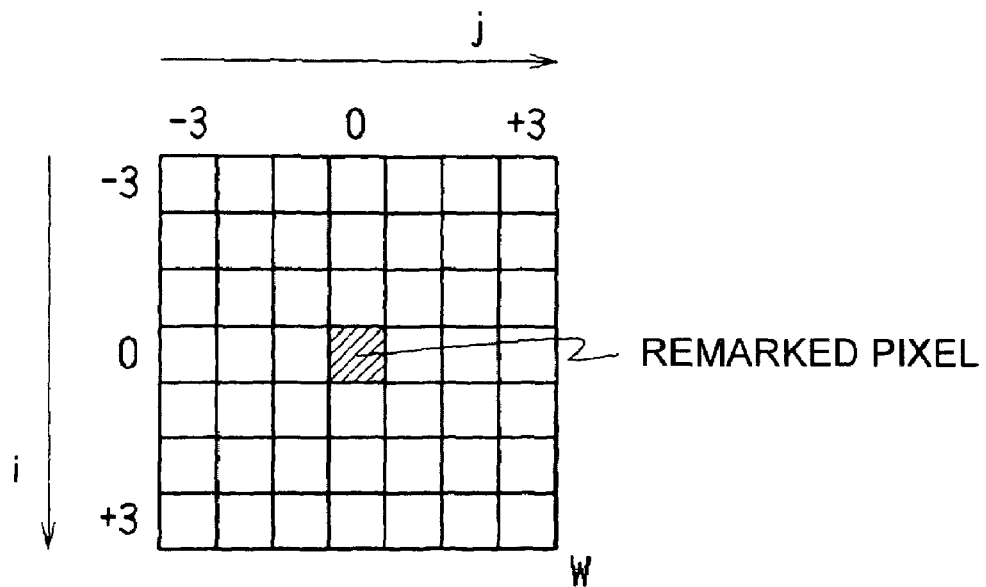
FIG. 3 is a schematic diagram used for generating a pixel-gradient matrix.

FIG. 2 is a block diagram illustrating a detailed configuration of the image processing unit 3A. In the image processing unit 3A, an edge detection unit 12 detects an edge-gradient direction having a largest gradient of a pixel value and an edge direction orthogonal to the edge-gradient direction for each pixel of the image data D1. That is to say, in the edge detection unit 12, a gradient-matrix generation unit 13 sequentially changes a remarked pixel, for example in the order of raster scanning, and generates a matrix G of the luminance gradient expressed by the following expression for each pixel by the processing using pixel values in a range W with a remarked pixel as center as shown in FIG. 3. In this regard, FIG. 3 is an example in which ±3 pixels in the x-direction and in the y-direction with a remarked pixel as center are set within the range W.

Expression 1

$$G = \int_W gg^T w dA \quad (1)$$

$$= \sum_w \begin{pmatrix} g_x^{(i,j)} g_x^{(i,j)} w^{(i,j)} & g_x^{(i,j)} g_y^{(i,j)} w^{(i,j)} \\ g_x^{(i,j)} g_y^{(i,j)} w^{(i,j)} & g_y^{(i,j)} g_y^{(i,j)} w^{(i,j)} \end{pmatrix}$$

$$\equiv \begin{pmatrix} G_{xx} & G_{xy} \\ G_{xy} & G_{yy} \end{pmatrix}$$

Also, w(i, j) is a Gaussian weight expressed by Expression (2), and g is a luminance gradient expressed by Expression (3) using an x-direction partial differential gx of an image luminance I and a y-direction partial differential gy of the image luminance I.

Expression 2

$$w^{(i,j)} = \exp\left(-\frac{i^2 + j^2}{2\sigma^2}\right) \quad (2)$$

Expression 3

$$g = (g_x, g_y) \quad (3)$$

$$= \left(\frac{\partial I}{\partial x}, \frac{\partial I}{\partial y}\right)$$

In this manner, in the edge detection unit 12, the gradient-matrix generation unit 13 detects the luminance gradient produced by performing weighting processing on the predetermined range W with a remarked pixel as center on the basis of the remarked pixel.

In the edge detection unit 12, a subsequent eigenvalue-and-eigenvector detection unit 14 processes the matrix G of the luminance gradient generated by the gradient-matrix generation unit 13, and thereby detects an edge-gradient direction v1 having a largest gradient of a pixel value and an edge direction v2 orthogonal to the edge-gradient direction v1 for the remarked pixel. Also, the eigenvalue-and-eigenvector detection unit 14 detects eigenvalues λ1 and λ2 indicating the variances of the gradients of individual pixel values in the edge-gradient direction v1 and in the edge direction v2.

Specifically, the eigenvalue-and-eigenvector detection unit 14 detects the eigenvalues λ1 and λ2 (λ1≧λ2) in the edge-gradient direction v1 and in the edge direction v2, respectively, by the processing of the following expressions.

Expression 4

$$\lambda 1 = \frac{G_{xx} + G_{yy} + \sqrt{a}}{2} \quad (4)$$

Expression 5

$$\lambda 2 = \frac{G_{xx} + G_{yy} - \sqrt{a}}{2} \quad (5)$$

-continued

Expression 6

$$v1 = \frac{v'1}{\|v'1\|} \quad (6)$$

$$v'1 = \left(\frac{G_{xx} - G_{yy} + \sqrt{a}}{2G_{xy}}, 1\right)$$

Expression 7

$$v2 = \frac{v'2}{\|v'2\|} \quad (7)$$

$$v'2 = \left(\frac{G_{xx} - G_{yy} - \sqrt{a}}{2G_{xy}}, 1\right)$$

Note that a is obtained by the following expression.

Expression 8

$$a = G_{xx}^2 + 4G_{xy}^2 - 2G_{xx}G_{yy} + G_{yy}^2 \quad (8)$$

An edge-direction processing unit 15 calculates an edge direction vc of each pixel of image data D2 after resolution transformation on the basis of the edge direction v2 of the remarked pixel of the image data D1 detected by the edge detection unit 12 in this manner, and sequentially calculates pixel values corresponding to each pixel Pc of the output-image data D2.

Figure 5:
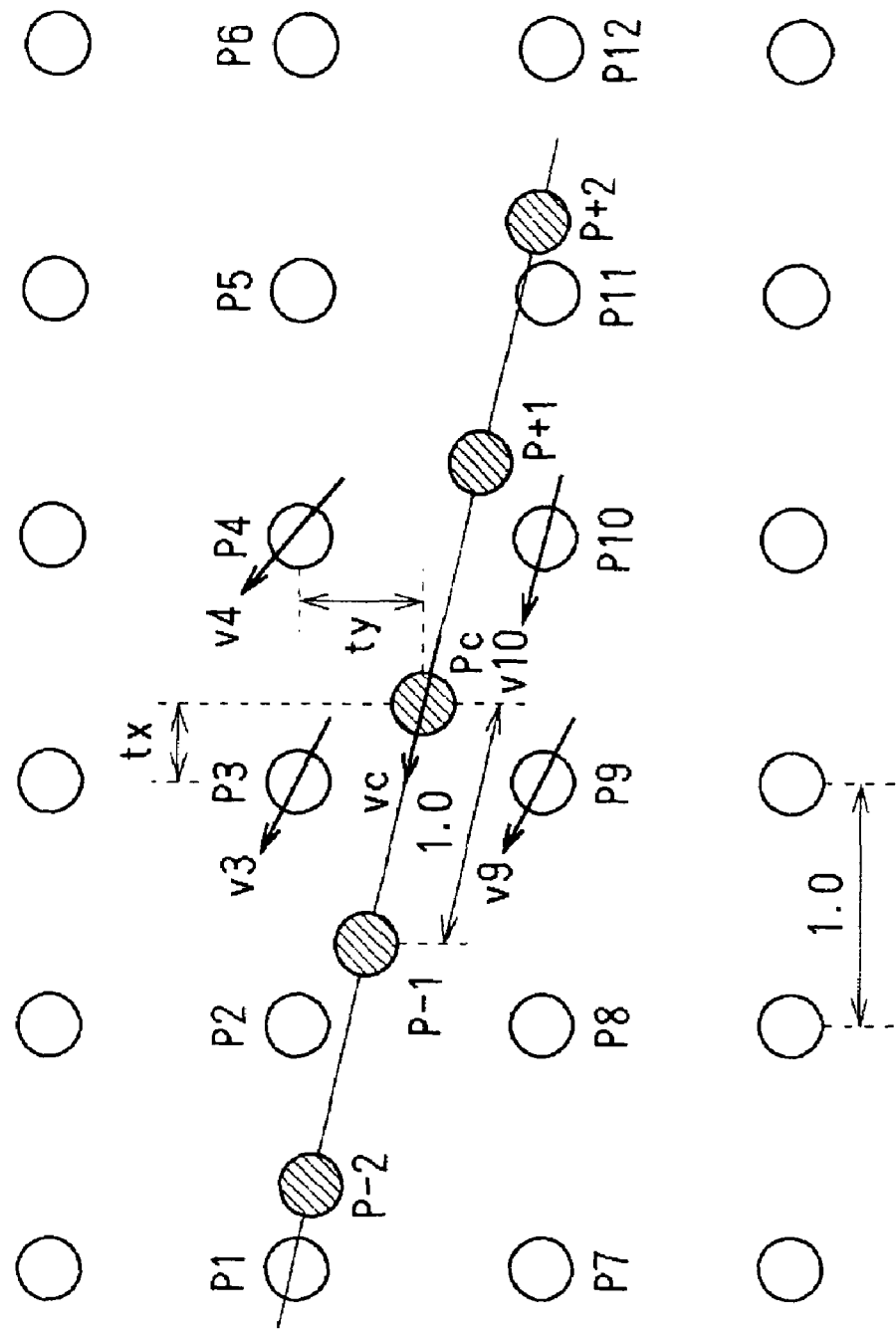
FIG. 5 is a schematic diagram used for explaining the operation of an edge-direction processing unit.

That is to say, as shown in FIG. 5, the edge-direction processing unit 15 performs the processing of the following expression on each pixel (P3, P4, P9, and P10 in the example in FIG. 5) of the image data D1 adjacent to a pixel (in the following, called as a remarked pixel of the image data D2) Pc of the output-image data D2 to be calculated. Thus, the edge-direction processing unit 15 calculates the edge direction vc of the remarked pixel Pc by interpolation processing using the edge direction v2 (v3, v4, v9, and v10) of the adjacent pixels of the image data D1.

Expression 9

$$v_c = (1-t_y)((1-t_x)v_3 + t_x v_4) + t_y((1-t_x)v_9 + t_x v_{10}) \quad (9)$$

In this regard, tx and ty are coordinate values of the remarked pixel internally dividing the sampling points P3, P4, P9, and P10 of the image data D1 in the x-direction and in the y-direction, respectively. Here, 0≦tx≦1 and 0≦ty≦1.

Furthermore, the edge-direction processing unit 15 sets a predetermined number of sampling points P-2, P-1, P1, and P2 in the line in the edge direction vc from the sampling points of the remarked pixel Pc with the sampling pitch of the image data D1 using the edge direction vc of the remarked pixel Pc calculated in this manner. In addition, the edge-direction processing unit 15 calculates each pixel value of the sampling points P-2, P-1, P1, and P2, and the remarked pixel Pc by the interpolation processing using the pixel values of the image data D1. Thus, the edge-direction processing unit 15 generates interpolation image data in the edge direction by the interpolation processing of the input-image data D1 in a line extending in the edge direction vc for each pixel of the output-image data D2 on the basis of the detection result of the edge detection unit 12.

Also, at this time, the edge-direction processing unit 15 changes the number of the sampling points set in this manner in accordance with the calculation result by an edge-direction processing range determination unit 16 described below, also changes the subsequent filtering processing, and thus changes the number of taps of the filtering processing in accordance with the reliability of the edge of the remarked pixel in the edge direction vc. Specifically, for example, when the subsequent filtering processing is performed with three taps, the pixel value of the remarked pixel Pc is calculated by linear interpolation using the surrounding pixels P3, P4, P9, and P10. Also, the pixel values of the adjacent sampling points P-1 and P1 are calculated by linear interpolation using P2, P3, P8, and P9, and P4, P5, P10, and P11, respectively, in the same manner. In contrast, when the subsequent filtering processing is performed with five taps, the pixel value of the remarked pixel Pc is calculated by the linear interpolation using the surrounding pixels P3, P4, P9, and P10, and the pixel values of the sampling points P-2, P-1, P1 and P2 are calculated in the same manner.

Next, the edge-direction processing unit 15 performs smoothing processing on the pixel values of the sampling points P-2, P-1, P1 and P2, and the remarked pixel Pc calculated in this manner to determine the pixel value Pc' of the remarked pixel Pc. That is to say, in the case of filtering with three taps, for example, the pixel value Pc' of the remarked pixel Pc is calculated by the processing of the following expression.

Expression 10

$$P'_c = 0.25 \times P_{-1} + 0.5 \times P_c + 0.25 \times P_{+1} \quad (10)$$

In contrast, in the case of filtering with five taps, for example, the pixel value Pc' of the remarked pixel Pc is calculated by the processing of the following expression.

Expression 11

$$P'_c = \\ 0.0625 \times P_{-2} + 0.25 \times P_{-1} + 0.375 \times P_c + 0.25 \times P_{+1} + 0.0625 \times P_{+2} \quad (11)$$

Thus, in this embodiment, the pixel values corresponding to the pixels of the output-image data D2 are calculated by the smoothing processing of the interpolation image data in the edge direction. Thereby, the loss of high frequency components is effectively avoided and the occurrences of jaggy at edges are prevented. In this regard, for the interpolation processing used for the generation of this interpolation image data, various interpolation processing using various surrounding pixels can be widely applied in addition to the linear interpolation using the pixel values of the adjacent pixels in the vicinity. Also, for the processing of the filtering processing using the interpolation image data, the interpolation processing is not limited to the above-described processing by the expressions (10) and (11), and interpolation processing by various weighting coefficients can be widely applied.

Incidentally, when the pixel values of the image data D2 are calculated by detecting the edge directions for each pixel in this manner, the smoothing processing might be performed in the direction orthogonal to the luminance gradient at the portions without edges. In such a case, the image quality becomes rather deteriorated if the filtering processing is performed with a large number of taps in a large range. However, on the contrary, at edge portions, the filtering processing is performed in a large range, it is possible to reliably prevent the occurrence of jaggy furthermore, and thus smooth edges can be formed.

Accordingly, in this embodiment, the number of taps for filtering portion is changed for each pixel, and thus the range of the smoothing processing in the edge direction is changed for each pixel. Also, the range of such smoothing processing is changed by the reliability of the edges in the edge direction vc, and thus the image deterioration by the smoothing processing is prevented.

Figure 6:
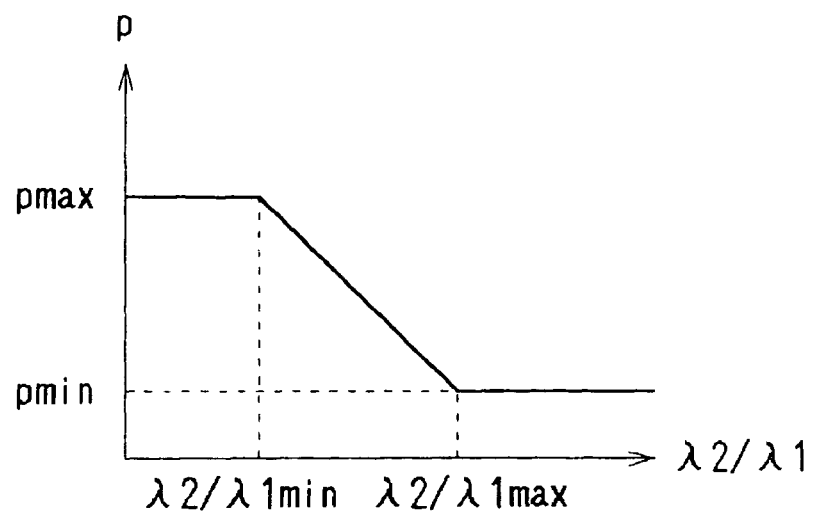
FIG. 6 is a characteristic curve illustrating a parameter used to set a range of smoothing processing.

Specifically, in this embodiment, the reliability of the edge in such an edge direction vc is detected by the ratio $\lambda 2/\lambda 1$ of the eigenvalue $\lambda 2$ in the edge direction v2 to the eigenvalue $\lambda 1$ in the edge-gradient direction v1. That is to say, when the ratio $\lambda 2/\lambda 1$ is small, the gradient of the pixel value in the edge-gradient direction v1 is dominant for the remarked pixel, and the edge is determined to be intensive in the edge direction v2. Thus, as shown in FIG. 6, the edge-direction processing range determination unit 16 generates the parameter p whose value increases linearly in accordance with a decrease of the value of the ratio $\lambda 2/\lambda 1$ while the ratio $\lambda 2/\lambda 1$ is in a certain range between $\lambda 2/\lambda 1$ min and $\lambda 2/\lambda 1$ max, and whose value becomes the maximum value pmax and the minimum value pmin when the value of the ratio $\lambda 2/\lambda 1$ is outside the certain range between $\lambda 2/\lambda 1$ min and $\lambda 2/\lambda 1$ max, respectively. Thus, the parameter p, which changes its value in accordance with the reliability of the edge in the edge direction, is generated.

Figure 7:
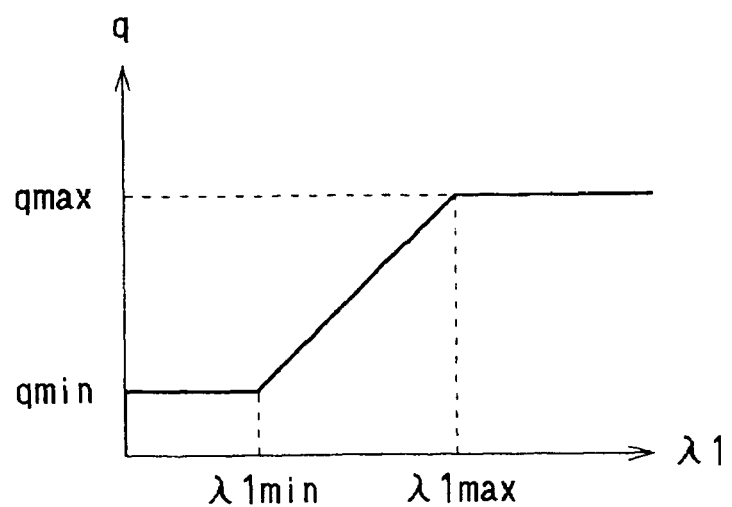
FIG. 7 is a characteristic curve illustrating another parameter used to set a range of smoothing processing.

Also, when the eigenvalue $\lambda 1$ in the edge-gradient direction v1 is large, the contrast on each side of the edge is high and the edge is said to be clear. Thus, as shown in FIG. 7, the edge-direction processing range determination unit 16 generates a parameter q whose value increases linearly in accordance with the value of the eigenvalue $\lambda 1$ within a predetermined range between $\lambda 1$ min and $\lambda 1$ max, and whose value becomes the minimum value qmin and the maximum value qmax when the value of the ratio $\lambda 1$ is smaller and larger than the range between $\lambda 1$ min and $\lambda 1$ max, respectively. Thus, the parameter q, which changes its value in accordance with the rise of the edge, is generated.

The edge-direction processing range determination unit 16 performs the multiplication processing expressed by the following expression on these two parameters p and q, and thus calculates the range r of the filtering processing of the edge-direction processing.

Expression 12

$$r = p \times q \quad (12)$$

In this regard, the edge-direction processing range determination unit 16 transforms the eigenvalues $\lambda 1$ and $\lambda 2$ by the sampling values of the image data D1 into the range r of the filtering processing so as to corresponds to the sampling points of the image data D2 of the processing by the edge-direction processing unit 15. In this case, after the range r of the filtering processing is calculated by the sampling points of the image data D1, the range r of the filtering processing of the image data D2 may be calculated by the interpolation processing of this calculation result. Also, on the contrary to this, after the eigenvalues $\lambda 1$ and $\lambda 2$ of the sampling points of the image data D1 are subjected to the interpolation processing to calculate the eigenvalues $\lambda 1$ and $\lambda 2$ of the sampling points of the image data D2, the range r of the filtering processing may be calculated by the calculation result.

Thus, the edge-direction processing unit 15 calculates the pixel value Pc' of the remarked pixel Pc of the image data D2 by changing the number of taps of the filtering processing by the range r calculated in this manner.

In this filtering processing, the edge-direction processing unit 15 performs integration processing of the filtering results, and thus performing the filtering processing with a real number of taps. Thus, unnaturalness, which occurs at the time of changing the number of taps when performing the filtering processing with an integer number of taps, is eliminated.

That is to say, the edge-direction processing unit 15 defines a filter with an integer number of taps shown by the following expression. In this regard, here, in this embodiment, odd numbers 1, 3, 5, . . . is applied to the integer number of taps.

Expression 13

$$n_{integer}^{-1} = \text{floor}(n_{real})$$

$$n_{integer}^{+1} = \text{ceil}(n_{real}) \tag{13}$$

Here, floor (n) is a maximum integer number of taps which does not exceed n, and ceil (n) is a minimum integer of taps of n or more. Also, the range r calculated by the expression (12) is applied to nreal. Thus, when n=3.5, the floor (n) becomes the number of taps, 3, and the ceil (n) becomes the number of taps, 5.

The integration processing of the filtering results is performed by means of the calculation of the filtering processing result f(n) with a real number by executing the processing of the following expression using these two kinds of filtering processing results. Thus, the edge-direction processing unit 15 performs the filtering processing using these two kinds of the numbers of taps depending on the range r of the filtering processing. Furthermore, the edge-direction processing unit 15 performs the processing of the expression (14) using these two kinds of filtering processing results to calculate the pixel value Pc' of the remarked pixel Pc of the image data D2. Thus, the edge-direction processing unit 15 performs the filtering processing by the numbers of taps in accordance with the reliability of the edge in the edge direction to calculate the pixel value Pc' of the remarked pixel Pc of the image data D2, and thereby makes it possible to change the number of taps by the fractional part of a decimal.

Expression 14

$$f(n) = \alpha f(n_{integer}^{-1}) + (1-\alpha) f(n_{integer}^{+1}) \tag{14}$$

where $\alpha = (n_{integer}^{+1} - n_{real})/2$

Figure 8:
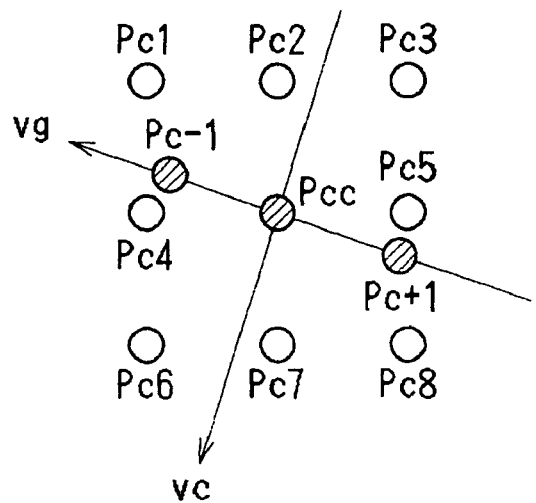
FIG. 8 is a schematic diagram used for explaining the operation of an edge-gradient direction processing unit.

An edge-gradient direction processing unit 17 performs contour enhancement processing in the edge-gradient direction v1 using the pixel value Pc' of the remarked pixel Pc of the image data D2 calculated by the edge-direction processing unit 15 in this manner. That is to say, as shown in FIG. 8, the edge-gradient direction processing unit 17 calculates the edge-gradient direction vg of the remarked pixel Pcc of the image data D2 by the edge-gradient direction v1 of the adjacent sampling points of the image data D1 in the same manner as the edge-direction processing unit 15 calculates the edge direction vc of the remarked pixel Pc of image data D2.

Furthermore, the edge-gradient direction processing unit 17 sets a predetermined number of sampling points Pc−1 and Pc+1 in the line in the edge-gradient direction vg from the sampling points of the remarked pixel Pcc with the sampling pitch of the image data D2 using the edge-gradient direction vg of the remarked pixel Pcc calculated in this manner. In addition, the edge-gradient direction processing unit 17 calculates each pixel value of the sampling points Pc−1 and Pc+1, and the remarked pixel Pcc by the interpolation processing using the pixel values output from the edge-direction processing unit 15. Thus, the edge-gradient direction processing unit 17 generates interpolation image data in the edge-gradient direction by the interpolation processing of the image data output from the edge-direction processing unit 15 in a line extending in the edge-gradient direction vg for each pixel of the output-image data D2 on the basis of the detection result of the edge detection unit 12.

Next, the edge-gradient direction processing unit 17 performs filtering processing on the pixel values of the sampling points Pc−1 and Pc+1, and the remarked pixel Pcc calculated in this manner to determine the pixel value Pcc' of the remarked pixel Pcc. The example in FIG. 8 is the case where the pixel value Pcc' of the remarked pixel Pcc is calculated by three taps. The pixel value of the sampling point Pc−1 is generated by the linear interpolation by the surrounding sampling points Pc1, Pc2, Pc4, and Pcc. Also, the pixel value of the sampling point Pc+1 is generated by the linear interpolation by the surrounding sampling points Pcc, Pc5, Pc7, and Pc8. Thereby, the edge-gradient direction processing unit 17 enhances contour in the direction of crossing the edge. In this regard, for the interpolation processing used for the generation of this interpolation image data, various interpolation processing using various surrounding pixels can be widely applied in addition to the linear interpolation using the pixel values of such adjacent pixels in the vicinity. Also, for the processing of the filtering processing using the interpolation image data, interpolation processing by various weighting coefficients can be widely applied.

Figure 9:
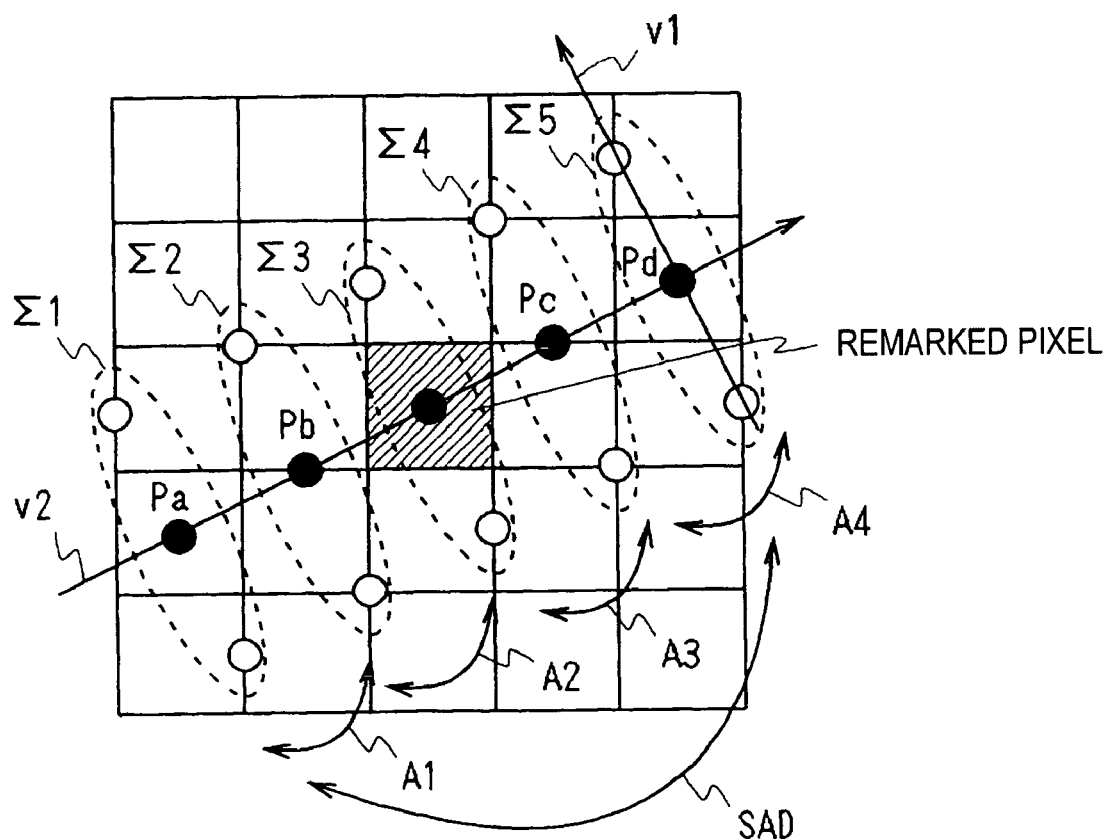
FIG. 9 is a schematic diagram used for explaining the detection of a reliability in a reliability-calculation unit.

A reliability calculation unit 18 calculates reliabilities f in the edge-gradient direction and the edge direction. For this purpose, as shown in FIG. 9, the reliability calculation unit 18 sets sampling points Pa, Pb, Pc, and Pd (indicated by a black circle) for calculating the reliability at a certain sampling pitch before and after the remarked pixel in the vicinity in the edge direction v2 using the edge direction v2 of the remarked pixel to be processed to obtain the pixel value of each of the sampling values Pa, Pb, Pc, and Pd by the pixel values output from the edge-direction processing unit 15. In this regard, if the pixel value of each of the sampling values Pa, Pb, Pc, and Pd is difficult to be obtained from the image data output from the edge-direction processing unit 15, the reliability calculation unit 18 performs the interpolation processing of the pixel values of the surrounding pixels of each sampling point to obtain the pixel values of each of the sampling values Pa, Pb, Pc, and Pd. Incidentally, the example in FIG. 9 is the case where a sampling pitch in the horizontal direction is set to the sampling pitch of the output-image data D2, and two sampling points are set before and after the remarked pixel, respectively.

Also, the reliability calculation unit 18 sets sub-sampling points (indicated by a white circle) for calculating each reliability before and after the sampling points Pa, Pb, Pc, Pd, and the remarked pixel in the edge-gradient direction v1 using the edge-gradient direction v1 at the remarked pixel to obtain the pixel value of each sub-sampling point from the corresponding pixel value output from the edge-direction processing unit 15. In this regard, in this case, if the pixel value of each of the sub-sampling values Pa, Pb, Pc, and Pd is difficult to be obtained from the image data output from the edge-direction processing unit 15, the reliability calculation unit 18 also performs the interpolation processing of the pixel values of the surrounding pixels of each sub-sampling point to obtain the pixel values of the individual sub-sampling points. Incidentally, the example in FIG. 9 is the case where a sampling pitch in the vertical direction is set to the sampling pitch of the output-image data D2, and one sampling point is set before and after each sampling point and the remarked pixel in the edge direction v2.

Furthermore, as shown by broken lines, the reliability calculation unit 18 calculates the summations Σ1 to Σ5 among the pixel values of the sub-sampling points before and after in the edge-gradient direction v1 individually for the remarked pixel and the pixels of the sampling points Pa, Pb, Pc, and Pd before and after the remarked pixel in the edge direction v2. Here, if a clear edge is formed in the edge-extension direction, nearly the same values are obtained from the summations Σ1 to Σ5 calculated in this manner. However, if the edge is not clear in the edge direction v2, these summations Σ1 to Σ5 have values that vary greatly.

Thus, as shown by arrows A1 to A4, the reliability calculation unit 18 calculates the subtraction values between the summations of adjacent sampling points Σ1 and Σ2, Σ2 and Σ3, Σ3 and Σ4, and Σ4 and Σ5. Also, the reliability calculation unit 18 obtains the absolute value of each subtraction value calculated in this manner, and adds the absolute values to obtain the additional vale SAD.

Figure 10:
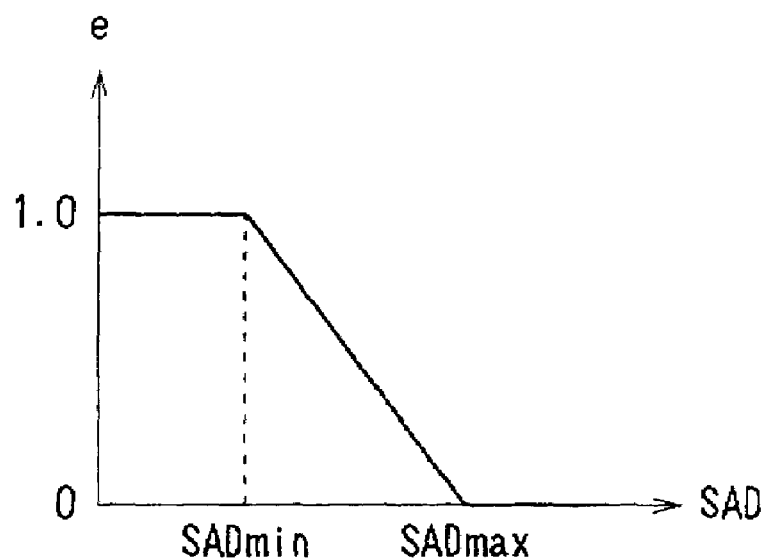
FIG. 10 is a characteristic curve illustrating a parameter of a reliability.

As shown in FIG. 10, the reliability calculation unit 18 generates a parameter e whose value decreases linearly in accordance with SAD within a predetermined range between SADmin and SADmax, and whose value becomes the upper limit value 1.0 and the lower limit value 0 when SAD is smaller and larger than the range between SADmin and SADmax, respectively.

Thus, the reliability calculation unit 18 sets sampling points at regular intervals in the edge direction, and obtains pixel values at the sampling points from the input-image data D1 in order to detect the reliability by comparing the pixel values. Also, at this time, the reliability calculation unit 18 sets sampling points before and after individual sampling points in the edge-gradient direction, and obtains the pixel values of individual sampling points from the total of the pixel values of the sampling points.

Furthermore, as shown by the following expression, the reliability calculation unit 18 calculates subtraction values diffh1, diffh2, diffv1, and diffv2 by individually subtracting the pixel values I−1 and I+1, which are adjacent to the remarked pixel in the horizontal direction, and I−v and I+v, which are adjacent to the remarked pixel in the vertical direction from the pixel value I0 of a remarked pixel on the basis of the corresponding pixel values output from the edge-direction processing unit 15.

Expression 15

$$diff_{h1} = I_0 - I_{-1}$$

$$diff_{h2} = I_0 - I_{+1}$$

$$diff_{v1} = I_0 - I_{-v}$$

$$diff_{v2} = I_0 - I_{+v} \quad (15)$$

Here, when the subtraction values diffh1 and diffh2 in the horizontal direction, and the subtraction values diffv1 and diffv2 in the vertical direction, which are calculated in this manner, have the same signs indicating positive or negative, the direction in which the subtraction values of the same signs is obtained is the case where the pixel value arises at the remarked pixel. Thus, it is unreliable that there is an edge in this direction. For this reason, the reliability calculation unit 18 determines whether the subtraction values diffh1 and diffh2 in the horizontal direction, and the subtraction values diffv1 and diffv2 in the vertical direction have the same signs or not, respectively, as shown by the following expressions. Also, if the signs match, the absolute values are obtained from the pair of subtraction values in the direction of matching, respectively, and then a smaller one of the absolute values is selected to be used for integrated difference values diffh and diffv in the horizontal direction and the vertical direction, respectively. Also, if the signs do not match, the integrated difference values diffh and diffv in the horizontal direction and the vertical direction, respectively, is set to 0.

Expression 16

When $diff_{h1}$ and $diff_{h2}$ have the same signs→$diff_h = min(|diff_{h1}|, |diff_{h2}|)$ Otherwise→$diff_h = 0$ When $diff_{v1}$ and $diff_{v2}$ have the same signs→$diff_v = min(|diff_{v1}|, |diff_{v2}|)$ Otherwise→$diff_v = 0 \quad (16)$ Furthermore, a larger one of the integrated difference values diffh and diffv in the horizontal direction and the vertical direction, respectively, calculated in this manner, is selected to be a parameter diff for calculating the reliability as shown by the following expression.

Expression 17

$$diff = max(diff_h, diff_v) \quad (17)$$

Figure 12:
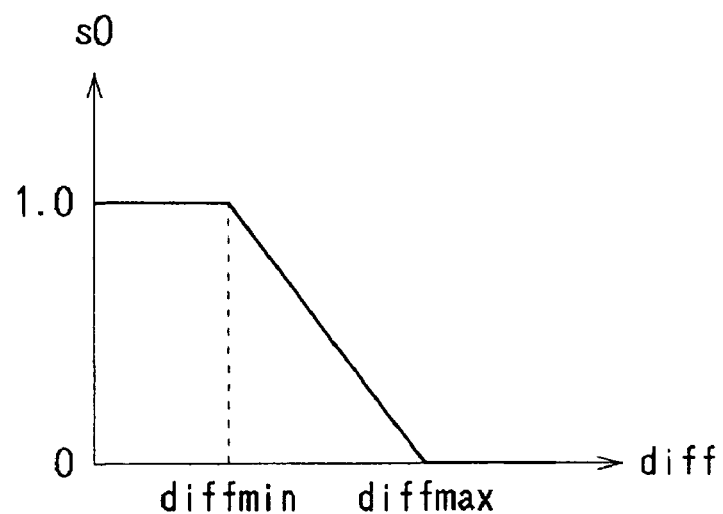
FIG. 12 is a characteristic curve illustrating a parameter of another reliability related to FIG. 11.

As shown in FIG. 12, the reliability calculation unit 18 generates a parameter s0 whose value decreases linearly in accordance with the parameter diff within a predetermined range between diffmin and diffmax, and whose value becomes the upper limit value 1.0 and the lower limit value 0 when the parameter diff is smaller and larger than the range between diffmin and diffmax, respectively.

Furthermore, as shown by the following expression, the reliability parameter s0 obtained in this manner and the reliability parameter e are multiplied to generate the parameter f indicating the reliability of the edge.

Expression 18

$$f = e \cdot s_0 \quad (18)$$

Thus, the reliability calculation unit 18 calculates the difference values with the pixel values of the adjacent pixels in the vertical direction and the horizontal direction to detect the reliability. In this regard, for the image data to be used for calculating the reliability, the input-image data D1 may be used in place of the output data of the edge-direction processing unit 15.

A blend-ratio determination unit 19 generates weighting coefficients for blending in accordance with the reliabilities of the edges in the edge direction vc. That is to say, as described above, when smooth processing is performed in the edge direction and contour-enhancement is performed in the direction orthogonal to the edge, excessive contour-enhancement sometimes occurs in a natural image. Accordingly, in this embodiment, the pixel value Pa of the image data D2 generated by a known method in the interpolation processing unit 2 and the pixel value Pcc' generated separately by the edge-gradient direction processing unit 17 are added with weighting by a blend processing unit 20 to produce the image data D2. The blend-ratio determination unit 19 changes the weighting coefficient of the addition processing with weighting. Also, the weighting coefficient is changed by changing the reliability of the edge in the edge direction, and thus unnaturalness of the excessive edge processing is prevented. Also, the ratio λ2/λ1 of the eigenvalue λ2 in the edge direction v2 to the eigenvalue λ1 in the edge-gradient direction v1 and the reliability f calculated by the reliability calculation unit 18 are applied to the reliability of the edge in the edge direction.

Figure 13:
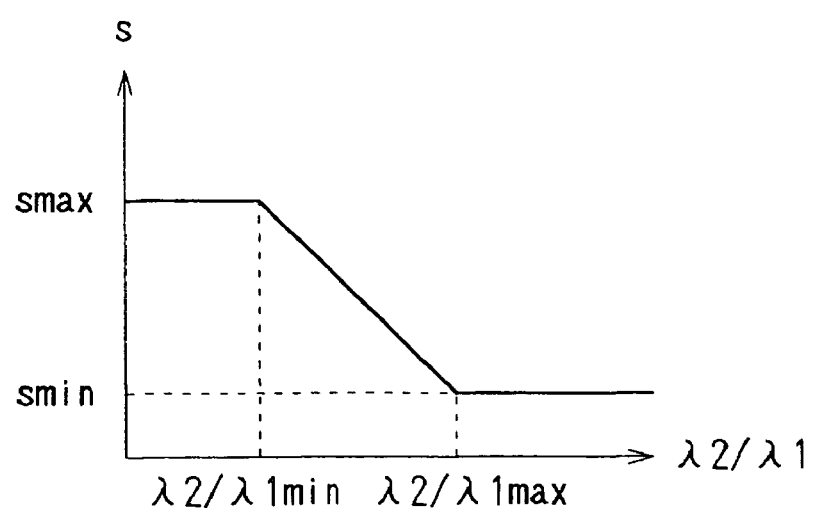
FIG. 13 is a characteristic curve illustrating a parameter used for a setting in a blend processing unit.

Specifically, in this embodiment, when the ratio λ2/λ1 is small, the gradient of the pixel value in the edge-gradient direction v1 is dominant in the remarked pixel, and the edge is determined to be intensive in the edge direction v2. Thus, as shown in FIG. 13, the blend-ratio determination unit 19 generates a parameter s whose value increases linearly in accordance with a decrease of the value of the ratio λ2/λ1 while the ratio λ2/λ1 is in a certain range between λ2/λ1min and λ2/λ1max, and the whose value becomes the maximum value smax and the minimum value smin when the value of the ratio λ2/λ1 is outside the certain range between λ2/λ1min and λ2/λ1max, respectively. Thus, the parameter s, which changes its value in accordance with the reliability of the edge in the edge direction, is generated.

Figure 14:
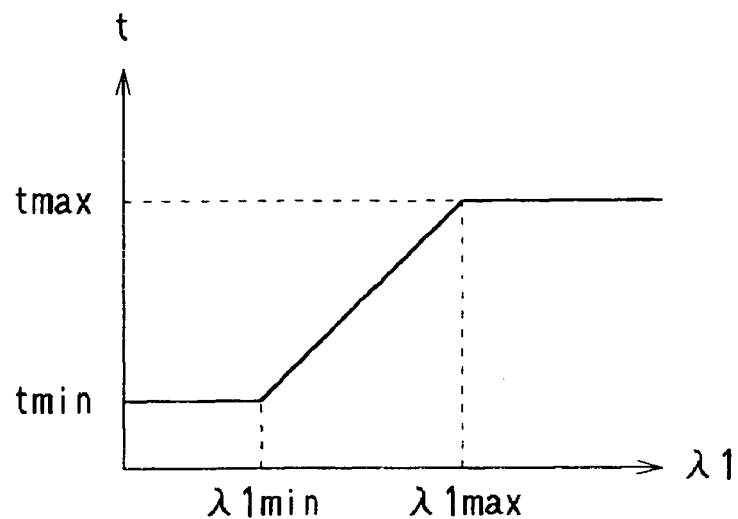
FIG. 14 is a characteristic curve illustrating another parameter used for a setting in the blend processing unit.

Also, when the eigenvalue λ1 in the edge-gradient direction v1 is large, the contrast on each side of the edge is high and the edge is said to be clear. Thus, as shown in FIG. 14, the blend-ratio determination unit 19 generates a parameter t whose value increases linearly in accordance with the value of the eigenvalue $\lambda1$ within a predetermined range between $\lambda1$min and $\lambda1$max, and whose value becomes the minimum value tmin and the maximum value tmax when the value is $\lambda1$min and $\lambda1$max, respectively. Thus, the parameter t, which changes its value in accordance with the rise of the edge, is generated.

As shown by the following expression, the blend-ratio determination unit 19 multiplies these parameters s and t, and the parameter f of the reliability calculated by the reliability calculation unit 18 to calculate the weighting coefficient β ($0 \leq \beta \leq 1$) for the blend processing.

Expression 19

$$\beta = s \times t \times f \tag{19}$$

In this regard, the blend-ratio determination unit 19 transforms the eigenvalues $\lambda1$ and $\lambda2$ of the sampling values of the image data D1 into the eigenvalues of the sampling values of the image data D2 so as to corresponds to the sampling points of the image data D2 in order to calculate the weighting coefficient β for blending.

A blend processing 20 performs weighted addition processing between the image data S3 based on the pixel values Pcc' calculated by the edge-gradient direction processing unit 17 and the image data S11 based on the pixel values Pa calculated by the interpolation processing unit 2 using the weighting coefficient β by the blend-ratio determination unit 19, and outputs the processing result as the image data D2.

Expression 20

$$S4 = \beta \times S3 + (1-\beta) \times S11 \tag{20}$$

In this manner, the image processing units 3A to 3E detects an edge-gradient direction having a largest gradient of each pixel value and an edge direction orthogonal to the edge-gradient direction for each pixel, and performs edge-enhancement processing and smoothing processing in each direction, respectively. Also, the image processing units 3A to 3E are set to have different characteristics to be used for the detection of the edge-gradient direction and the edge direction by the settings of the differential operators used by the gradient-matrix generation unit 13 for calculating the x-direction partial differential gx and the y-direction partial differential gy.

Specifically, the first to the fifth image processing units 3A to 3E individually calculate the x-direction partial differential gx and the y-direction partial differential gy by the differential operators expressed by the expressions (21) to (25). Accordingly, in this image processing apparatus 1, the plurality of image processing units 3A to 3E have different phase characteristics of the differential operators, and different characteristics being set for use with detecting the edge-gradient direction and the edge direction. Thus, if one image processing unit is difficult to detect the edge direction or the edge-gradient direction, a detection error has occurred, or the like, any one of the other image processing units can correctly detect the edge direction or the edge-gradient direction. In this regard, for these differential operators, frequency characteristics may be set differently in place of, or in addition to the phase characteristics.

Expression 21

$$\begin{bmatrix} x \\ y \end{bmatrix} = \begin{bmatrix} 1 & 0 & -1 \\ 1 & 0 & -1 \end{bmatrix} \tag{21}$$

-continued

Expression 22

$$\begin{bmatrix} x \\ y \end{bmatrix} = \begin{bmatrix} 1 & -1 & 0 \\ 1 & -1 & 0 \end{bmatrix} \tag{22}$$

Expression 23

$$\begin{bmatrix} x \\ y \end{bmatrix} = \begin{bmatrix} 1 & -1 & 0 \\ 0 & 1 & -1 \end{bmatrix} \tag{23}$$

Expression 24

$$\begin{bmatrix} x \\ y \end{bmatrix} = \begin{bmatrix} 0 & 1 & -1 \\ 1 & -1 & 0 \end{bmatrix} \tag{24}$$

Expression 25

$$\begin{bmatrix} x \\ y \end{bmatrix} = \begin{bmatrix} 0 & 1 & -1 \\ 0 & 1 & -1 \end{bmatrix} \tag{25}$$

The layer integration unit 4 sets the weighting coefficient γ of the image data D2A to D2E output from individual image processing units 3A to 3E in accordance with the ratio of the variance $\lambda1$ of the gradients of the pixel values in the edge direction to the variance $\lambda2$ of the gradients of the pixel values in the edge-gradient direction, and adds the image data D2A to D2E with weighting by the weighting coefficient γ in order to generate the output-image data D3 as shown by the following expression.

Expression 26

$$f = \sum_{i=0}^{n} \frac{\gamma_i f_i}{\sum_{i=0}^{n} \gamma_i} \tag{26}$$

In this regard, in this embodiment, as is understood from the expressions (21) to (25), the differential operators are set symmetrically between the second and the fifth image processing units 3B and 3E, and the third and the fourth image processing units 3C and 3D, respectively, on the basis of the setting of the differential operator of the first image processing unit 3A. The layer integration unit 4 generates the weighting coefficient using the variances $\lambda1$ and $\lambda2$ detected by the first image processing unit 3A to be the basis.

Figure 15:
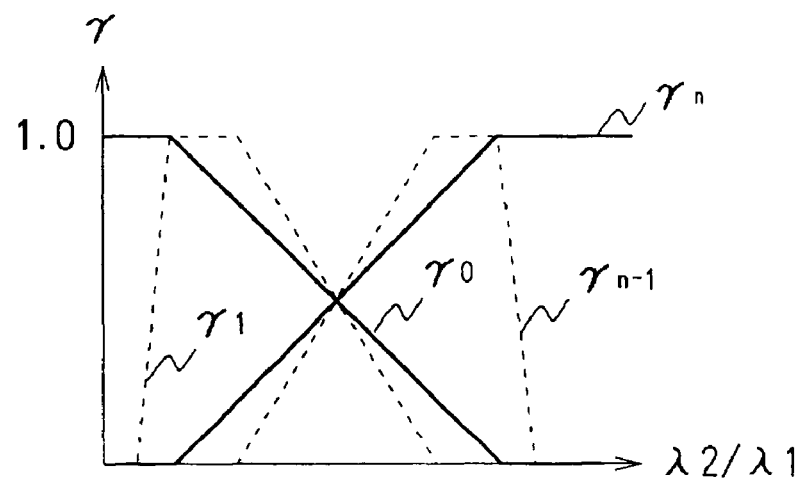
FIG. 15 is characteristic curves illustrating parameters related to the processing of an integration unit.

Here, FIG. 15 is characteristic curves illustrating an example of the settings of the weighting coefficients γ0 to γ4. The example in FIG. 15 illustrates the settings of the weighting coefficients in two image processing units in which differential operators are set symmetrically. The layer integration unit 4 sets the weighting coefficients so as to change the values complementarily for each group of image processing units having the differential operators set symmetrically in a predetermined range. Thus, in the example in FIG. 15, the weighting coefficients γ0 and γn, and γ1 and γn−1 are set to form a group, respectively.

In this regard, layer integration unit 4 normalizes the results of the addition with weighting such that the total value of the weighting coefficients becomes the value 1, and outputs the output-image data D3. Also, in place of the weighted addition by setting the weighting coefficients using the variances $\lambda1$ and $\lambda2$ detected by one of the plurality of image processing units 3A to 3E, the weighting coefficients of the individual image processing units 3A to 3E may be set by the variances λ1 and λ2 detected by the individual image processing units 3A to 3E to perform weighted addition, and then normalization may be performed.

Operation of the Embodiment

Figure 4:
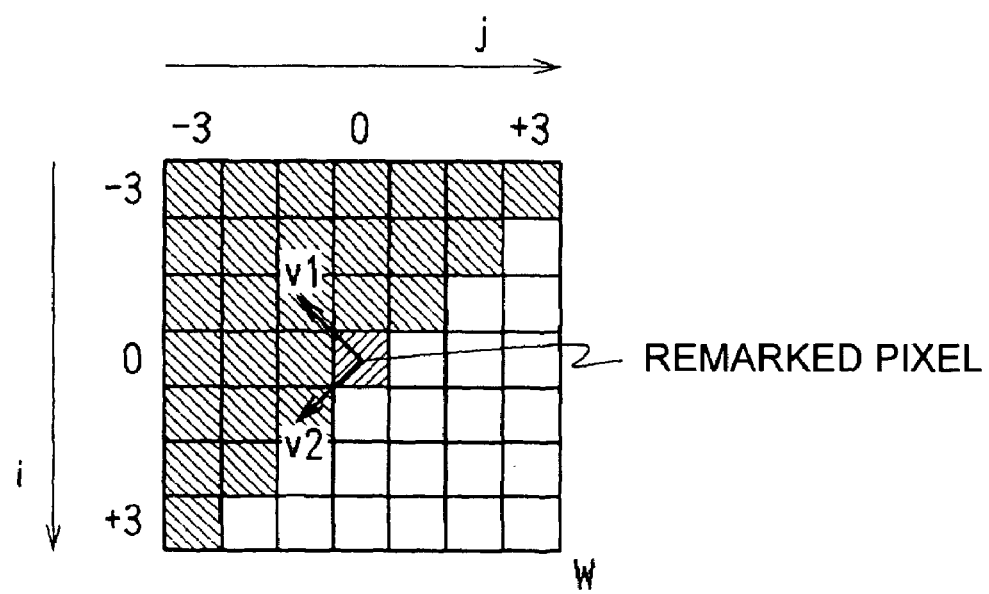
FIG. 4 is a schematic diagram used for explaining an edge-gradient direction and an edge direction.

In the above-described configuration, in the image processing apparatus 1 (FIGS. 1 and 2), the input-image data D1 is input to the edge detection unit 12 of the first image processing unit 3A. Here, the edge-gradient direction v1 having a largest gradient of a pixel value and the edge direction v2 orthogonal to the edge-gradient direction v1 for each pixel are detected in sequence (Expressions (1) to (8), FIGS. 3 and 4). Also, the input-image data D1 is input to the edge-direction processing unit 15. Here, the image data is subjected to smooth processing in the edge direction v2 for each pixel of the output-image data D2 on the basis of the detection result of the edge detection unit 12, and the pixel value Pc corresponding to each pixel of the output-image data D2 is calculated in sequence (Expressions (9) to (14), FIG. 5) Also, the pixel value Pc from the calculation result is input to the edge-gradient direction processing unit 17. Here, the contour enhancement processing in the edge-gradient direction v1 is performed for each pixel of the output-image data D2 on the basis of the detection result of the edge detection unit 12 in order to calculate the pixel values of the output-image data D2 (Expressions (9) to (14), FIG. 8).

Thus, the input-image data D1 is subjected to the smooth processing in the edge direction v2, thereby the occurrence of jaggy is effectively prevented. Also, the contour enhancement is performed in the edge-gradient direction v1 orthogonal to the edge direction v2, and thus high frequency components are enhanced in the direction orthogonal to the edge direction. Accordingly, the input-image data D1 is transformed into the image data D2 while the loss of high frequency components is effectively avoided and the occurrence of jaggy is prevented.

However, it has been found that when the smoothing processing and the contour enhancement processing are performed by detecting the edge direction and the edge-gradient direction in this manner, edges are sometimes difficult to be detected correctly depending on the characteristic used for detecting the edge direction and the edge-gradient direction, and thus edges of a specific pattern is difficult to be correctly processed, for example.

Thus, in the image processing apparatus 1, the input-image data D1 is also input to the second to the fifth image processing units 3B to 3E having the same configuration as the first image processing unit 3A and different characteristics to be used for the detection of the edge direction and the edge-gradient direction, and is individually subjected to the smoothing processing and the contour enhancement processing by the detection of the edge direction and the edge-gradient direction in the same manner as the image processing unit 3A. Also, the processing results by the first to the fifth image processing units 3A to 3E are integrated by the layer integration unit 4 (Expression (26)).

Thus, in the image processing apparatus 1, if one of the five image processing units 3A to 3E is difficult to detect the edge direction and the edge-gradient direction, a detection error has occurred, or the like, the other image processing units can correctly detect the edge direction and the edge-gradient direction. Accordingly, the image quality can be reliably improved by preventing dissimilarity and roughness. Also, the discrimination ability between edges and texture is improved, and thereby making it possible to improve image quality.

Thus, the input-image data D1 is subjected to a series of processing. In each of the image processing units 3A to 3E, the gradient-matrix generation unit 13 of the edge detection unit 12 generates the matrix G of the luminance gradient for each pixel. The matrix G of the luminance gradient is subject to the processing by the subsequent eigenvalue-and-eigenvector detection unit 14, and thus the edge-gradient direction v1 and the edge direction v2 are detected.

In each of the image processing units 3A to 3E, the differential operator used for the generation of the matrix G of the luminance gradient is set to have different phase characteristic (Expressions (21) to (25)). Thus, the edge direction and the edge-gradient direction are individually performed by different characteristics. Accordingly, the image processing apparatus 1 is provided with a plurality of the image processing units 3A to 3E having different characteristics. These image processing units 3A to 3E have almost the same configuration, and the entire processing can be simplified to that extent.

Also, an input-video signal S1 is subjected to the processing of the matrix G of the luminance gradient to calculate the eigenvalues λ1 and λ2 indicating the variances of the gradients of the pixel values in the edge-gradient direction v1 and the edge direction v2. Here, the ratio λ2/λ1 of the eigenvalues λ1 and λ2 indicates the reliability in the edge direction. If the ratio λ2/λ1 is small, the edge can be rather correctly processed when the processing results of the other processing units is employed.

Thus, in the image processing apparatus 1, the eigenvalues λ1 and λ2 detected by the first image processing unit 3A are input to the layer integration unit 4, and the weighting coefficient γ of the processing result by each of the image processing units 3A to 3E is calculated in accordance with the ratio λ2/λ1 of the eigenvalues λ1 and λ2 here (FIG. 15). The output-image data D3 is generated by the weighted addition using this weighting coefficient γ (Expression (26)). Accordingly, the image processing apparatus 1 can improve image quality furthermore.

Also, in each of the image processing units 3A to 3E, the edge-direction processing range determination unit 16 generates the parameter p indicating the reliability of the edge by the ratio λ2/λ1 of the eigenvalues λ1 and λ2 (FIG. 6). Also, the eigenvalue λ1 indicates the intensity of the edge, and thus the parameter q corresponding to the parameter p is generated (FIG. 7). Also, the range r of the filtering processing is calculated in the edge-direction processing unit 15 by the multiplication of these parameters p and q.

Also, when the edge-direction processing unit 15 performs the filtering processing on the interpolation image data Pc in the edge direction of the input-image data D1 to generate the pixel value Pc' of the output-image data D2, the number of taps for the filtering portion is changed by the range r of the filtering processing generated by the edge-direction processing range determination unit 16 in this manner. If the reliability of the edge is high, the interpolation image data Pc in the edge direction is subjected to the filtering processing with a wide range to generate the pixel value Pc' of the output-image data D2. In contrast, if the reliability of the edge is low, the interpolation image data Pc in the edge direction is subjected to the filtering processing with a narrow range to generate the pixel value Pc' of the output-image data D2. Thus, for the input-image data D1, the number of taps of the filtering processing in the edge direction v2 is changed depending on the reliability of the edge (Expressions (10) to (14)). Accordingly, excessive smoothing processing at the portions except the edge is prevented, and the deterioration of the image is effectively avoided.

Also, in such smoothing processing, for the image data D1, the weighting coefficient α of the filtering processing is changed (Expression (12)) in accordance with the reliability of the edge in the edge direction v2. The weighted addition is performed on the filtering processing results using this weighting coefficient α (Expression (14)). Thus, the number of taps is changed by the fractional part of a decimal. Accordingly, unnaturalness, which occurs at the time of changing the number of taps when performing the filtering processing with an integer number of taps, is eliminated.

Incidentally, when a video signal is processed in this manner, the processing result by each of the image processing units 3A to 3E sometimes contains excessive contour enhancement in a picture of nature. Thus, the image data D1 is subjected to the interpolation processing by a known method in the interpolation processing unit 2 to calculate the pixel value Pa' of the output-image data D2 for each pixel. Thus, the image data S11 generated by the interpolation processing unit 2 by the know method has lost high-frequency components, but has not undergone contour enhancement excessively.

In each of the image processing units 3A to 3E, the image data S11 from the interpolation processing unit 2 and the image data S3 from the edge-gradient direction processing unit 17 are subjected to weighted addition processing in accordance with the image to generate the output-image data D2 (Expression (20)). Also, in the same manner as the case where the filtering processing range r is calculated by the edge-direction processing range determination unit 16, the parameter s indicating the reliability of the edge by the ratio $\lambda 2/\lambda 1$ of the eigenvalues $\lambda 1$ and $\lambda 2$ is calculated by the blend-ratio determination unit 19 (FIG. 13). Also, the parameter t indicating the reliability of the edge is generated by the eigenvalue $\lambda 1$ in the same manner (FIG. 14), and the weighting coefficient β is calculated by these parameters s and t (Expression (19)). Thus, the portion having excessive contour enhancement is subjected to correction by the pixel value Pa' by the known method to generate the output-image data D2. Accordingly, in this embodiment, the deterioration of the image quality due to the excessive contour enhancement is prevented.

Also, the reliability calculation unit 18 sets sampling points at certain intervals before and after the remarked pixel in the edge direction v2, and obtains the pixel value of each sampling point by the output data of the edge-direction processing unit 15. By the comparison of the pixel values, the reliability parameter e indicating the reliability in the edge-gradient direction and the edge direction is detected (Expression (18), FIGS. 9 and 10). Also, the weighting coefficient β generated by the blend-ratio determination unit 19 is corrected by the reliability parameter e (Expression (19)), and thus erroneous processing for a specific processing is prevented. In this regard, such a specific pattern is, for example the case where a line is perpendicular to an edge having a big change of a signal level, the case of having two edges crossed with each other, or the like.

Also, at this time, the reliability calculation unit 18 sets sub-sampling points before and after individual sampling points in the edge-gradient direction v1, and obtains the pixel values of individual sampling points from the total of the pixel values of the sub-sampling points. Thus, erroneous processing on such a specific pattern is reliably prevented.

Figure 11:
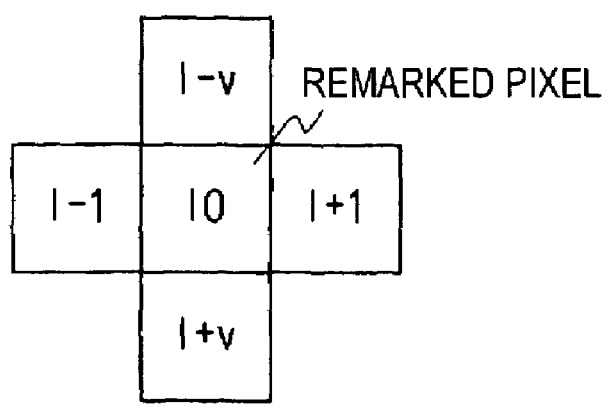
FIG. 11 is a schematic diagram used for explaining the detection of another reliability in the reliability-calculation unit.

Also, the reliability calculation unit 18 calculates the difference of the values between the remarked pixel and the adjacent pixels in the vertical direction and in the horizontal direction, and the comparison of these difference values detect the reliability parameter s0 indicating the reliability in the edge-gradient direction and in the edge direction (Expressions (15) to (17), FIGS. 11 and 12). Also, the weighting coefficient β generated by the blend-ratio determination unit 19 is also corrected by the reliability parameter s0 (Expression (19)), and thus erroneous processing for a specific processing is prevented. In this regard, such a specific pattern is, for example the case where light and darkness are repeated mosaically with a pixel pitch, or the like.

Advantages of the Embodiment

With the above configuration, the edge-enhancement processing and the smoothing processing are performed in an edge-gradient direction having a largest gradient of a pixel value and an edge direction orthogonal to the edge-gradient direction, respectively, in order to improve image quality. Also, the edge-gradient direction and the edge direction are detected by different characteristics, the edge-enhancement processing and the smoothing processing are performed for each characteristic, and then the processing result of each characteristic is integrated. Thus, the loss of high frequency components and the occurrence of jaggy are prevented in order to reliably improve image quality.

That is to say, a plurality of image processing units are provided. Each of the image processing units is provided with an edge detection unit for detecting the edge-gradient direction and the edge direction, an edge-direction processing unit for performing smoothing processing in the edge direction on the basis of the detection result of the edge detection unit, and an edge-gradient direction processing for performing contour enhancement processing in the edge-gradient direction on the basis of the detection result of the edge detection unit. Thus, the loss of high frequency components and the occurrence of jaggy are prevented in order to reliably improve image quality.

Also, the edge detection unit detects the edge-gradient direction and the edge-direction by differentiating pixel values in a certain range with a pixel to be processed as center, and the plurality of image processing units have different differential operators being set for use with differentiating the pixel values in order to have different characteristics being set for use with detecting the edge-gradient direction and the edge direction. Thus, major components of the plurality of the image processing units have common configurations, and thereby the entire configuration and the entire processing can be simplified.

Also, each of the image processing units is provided with a reliability calculation unit for detecting the reliabilities in the edge-gradient direction and the edge-direction, and a blend processing unit for correcting the pixel values output from the edge-gradient direction processing unit based on the pixel values of the input-image data in accordance with the reliabilities detected by the reliability calculation unit. Thus, it is possible to prevent excessive contour enhancement in a picture of nature.

Also, sampling points are set at certain intervals before and after the remarked pixel in the edge direction, and the reliability is detected by the comparison of the pixel values of the sampling points. Thus, erroneous processing for a specific pattern such as the case where two edges having different directions contact with each other is prevented. Accordingly, it is possible to reliably improve image quality.

Also, in this processing, sub-sampling points are individually set before and after the remarked pixel and sampling points in the edge-gradient direction, and the pixel value of each sampling point is obtained from the total value of the pixel values of the sub-sampling points. Thus, erroneous processing on such a specific pattern can be prevented. Accordingly, it is also possible to improve image quality.

Also, in this processing, the difference of the values between the remarked pixel and the adjacent pixels in the vertical direction and in the horizontal direction are calculated, and the comparison of these difference values detects the reliability, and thus erroneous processing for a specific processing such as the case where light and darkness are repeated mosaically with a pixel pitch can be prevented. Accordingly, it is also possible to improve image quality.

Also, the integration unit, which integrates the processing results of the plurality of the image processing units, sets the weighting coefficient of the image data output from each of the image processing units in accordance with the ratio of the variance of the gradients of the pixel values in the edge direction to the variance of the gradients of the pixel values in the edge-gradient direction. The image data is added with weighting by the weighting coefficient. Thus, the loss of high frequency components and the occurrence of jaggy are prevented in order to reliably improve image quality.

Second Embodiment

Figure 16:
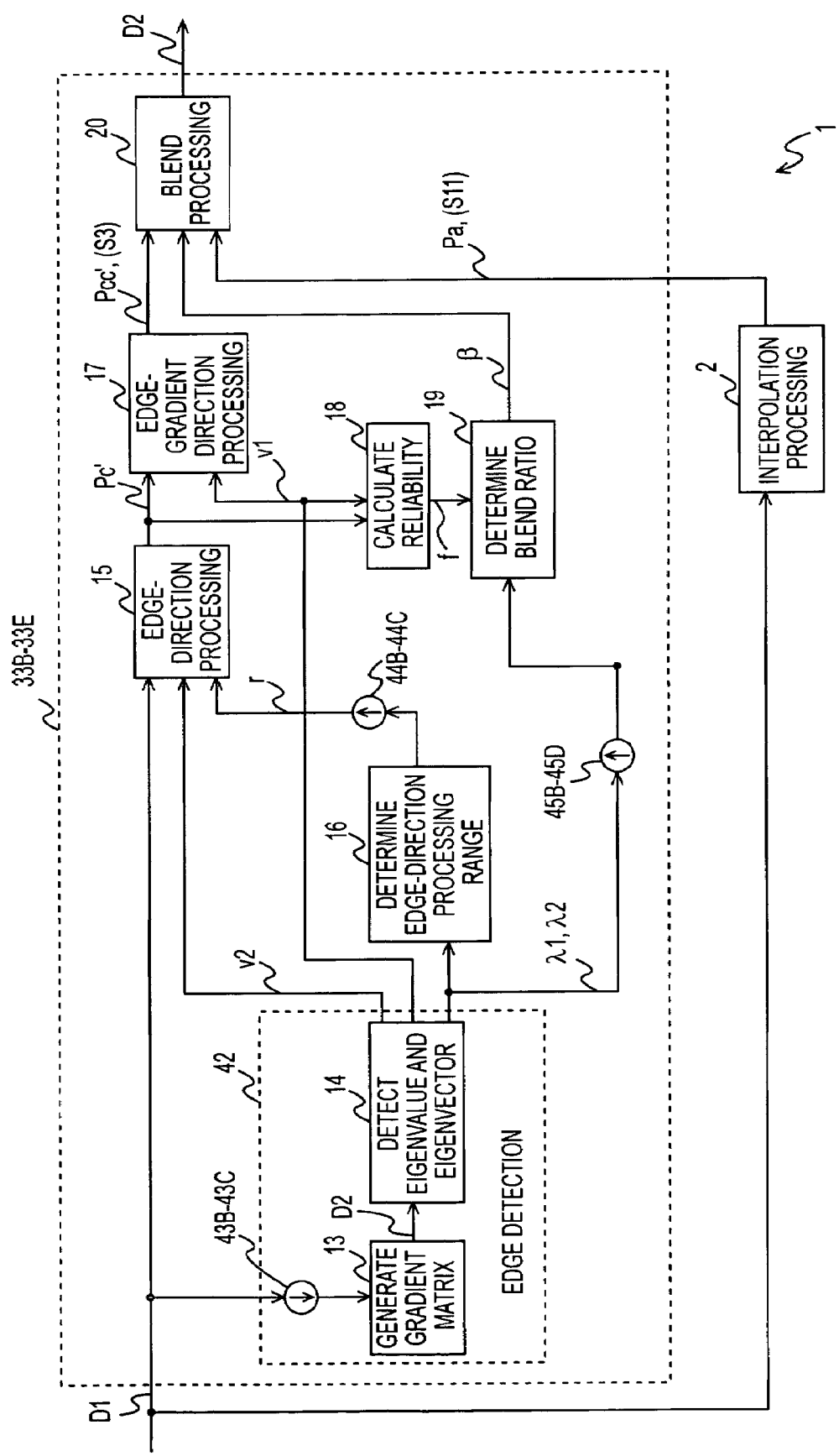
FIG. 16 is a functional block diagram illustrating second to fifth image processing units of an image processing apparatus according to another embodiment.

FIG. 16 is a block diagram illustrating an image processing unit to be applied to an image processing apparatus according to a second embodiment of the present invention. This image processing apparatus has the same configuration as that of the image processing apparatus 1 according to the first embodiment except that image processing units 33B to 33E shown in FIG. 16 are applied in place of the second to fifth image processing units 3A to 3E described above. Also, in the image processing units 33B to 33E shown in FIG. 16, the same components as those in the first image processing unit 3A are marked with the corresponding reference numerals, and the duplicated description will be omitted.

Here, in the edge detection units 12 and 42 of the first image processing unit 3A and the image processing units 33B to 33E, certain ranges used for the edge-gradient direction and the edge direction are set to be different with each other, and thus the characteristics used for detecting the edge-gradient direction and the edge direction are set to be different with each other.

More specifically, in the image processing units 33B to 33E, in the edge detection unit 42, the input data D1 is input to the gradient-matrix generation unit 13 through down-converters 43B to 43E, respectively. Here, the down-converter 43B of the second image processing unit 33B reduces the number of sampling of the input-image data D1 to ½ in the vertical direction and the horizontal direction, and outputs the data. In contrast, the down-converters 43C and 43D of the third and the fourth image processing units 33C and 33D reduce the number of sampling of the input-image data D1 to ¼ and ⅛, respectively, in the vertical direction and the horizontal direction, and output the data. Also, the down-converter 43E of the fifth image processing unit 33E reduces the number of sampling of the input-image data D1 to ¹⁄₁₆ in the vertical direction and the horizontal direction, and outputs the data.

Thus, in the image processing apparatus, certain ranges used for the edge-gradient direction and the edge direction are set to be different with each other in the first image processing unit 3A and the image processing units 33B to 33E. In this regard, the down-converters 43B to 43E reduce the number of sampling the input-image data D1 by the reduction of the number of sampling by thinning, or by the reduction of the number of sampling using filters.

Also, in order to correspond to these, the image processing units 33B to 33E up-convert the output value of the edge-direction processing range determination unit 16 and the eigenvalues $\lambda 1$ and $\lambda 2$ to be input to the blend-ratio determination unit 19 by the up-converters 44B to 44E and 45B to 45E, respectively.

In this regard, the up-converters 44B to 44E and 45B to 45E perform up-converting processing by an increase of sampling number by front-end interpolation, or an increase of sampling number using filters.

In the same manner as this embodiment, when certain ranges used for the edge-gradient direction and the edge direction are set to be different with each other, and the characteristics used for detecting the edge-gradient direction and the edge direction are set to be different with each other in a plurality of image processing units, the same effects as those in the first embodiment can be obtained.

Also, the different ranges are set by the settings of the number of sampling used for the down sampling of the input image data, and thus the major configuration of the plurality of image processing units can be made uniform. Accordingly, the entire configuration and processing can be simplified to that extent.

Third Embodiment

In this regard, in the second embodiment described above, a description has been given of the case where the up-convert processing is performed at the input of the edge direction processing and the blend-ratio determination unit 19. However, the present invention is not limited to this. The up-convert processing may be set at various places as necessary, for example, may be performed at the output stage of each image processing unit, etc. In this regard, when the up-convert processing is performed at the output stage, it becomes necessary for the edge-direction processing unit 15 and the edge-gradient direction processing unit 17 to process image data by down-converting. Thus, it becomes necessary to appropriately dispose down-converters depending on the places to be up-converted.

Also, in the second embodiment, a description has been given of the case where the number of sampling is sequentially reduced to ½ both in the vertical direction and in the horizontal direction. However, the present invention is not limited to this. For example, the number of sampling may be reduced to ½ either in the vertical direction or in the horizontal direction. Furthermore, the combination of these may be used, etc. The direction of down-converting may be set in various ways.

Also, in the second embodiment, a description has been given of the case where the ranges used for detecting the edge direction and the edge-gradient direction are set to be different in a plurality of image processing units by the setting of the number of sampling by down-converting. However, the present invention is not limited to this. The ranges used for detecting the edge-gradient direction and the edge direction may be set to be different in a plurality of image processing units by having different number of taps of the filter itself to be used for detecting the edge direction and the edge-gradient direction.

Also, in the above-described embodiments, a description has been given of the case where the reliability calculation unit 18 detects the reliability parameters e and s0 of by the two methods. However, the present invention is not limited to this. If a sufficient characteristic for practical use can be acquired, either the parameter e or s0 may be used.

Also, in the above-described embodiments, a description has been given of the case where the range of the smoothing processing in the edge direction is changed by changing the number of taps. However, the present invention is not limited to this. The number of taps may be changed in a geometrical ratio by changing the weighting coefficient of the smoothing processing.

Also, in the above-described embodiments, a description has been given of the case where the weighted addition processing in the range of the smoothing processing and the blend processing unit is changed by changing the ratio of the eigenvalues $\lambda 1$ and $\lambda 2$ and the eigenvalue $\lambda 1$. However, the present invention is not limited to this. If a sufficient characteristic for practical use can be acquired, only the ratio of the eigenvalues $\lambda 1$ and $\lambda 2$ may be changed. Also, various contour detection methods may be applied in place of the detection of the reliability of the edge by the ratio of the eigenvalues $\lambda 1$ and $\lambda 2$ and the eigenvalue $\lambda 1$. Also, excessive contour correction of the weighted processing of the blend processing occurs at the place where tree leaves are dense in a picture of nature. Thus, the contour detection may be changed by the characteristics of each portion of the image to be detected, for example by frequency characteristics, etc.

Also, in the above-described embodiments, a description has been given of the case where the weighted addition processing in the range of the smoothing processing and the blend processing unit is changed. However, the present invention is not limited to this. If a sufficient characteristic for practical use can be acquired, this processing may be omitted. Furthermore, any one of the processing or both processing may be omitted depending on the types of the image.

Also, in the above-described embodiments, a description has been given of the case where an image is enlarged and contracted by changing the sampling pitch of the input-image data D1. However, the present invention is not limited to this, and can be widely applied to the case of performing simple contour correction. In this case, the edge-direction processing and the edge-gradient direction processing may perform a series of processing on the output-image data having the same sampling pitch as that of the input-image data, and the interpolation processing should be omitted. Also, the blend processing unit 20 may simply perform contour enhancement on the input-image data by weighted adding the output data of the edge-gradient direction processing unit 17 and the input-image data.

Also, in the above-described embodiments, a description has been given of the case where image data is processed by performing a predetermined program by processing means. However, the present invention is not limited to this, and can be widely applied to the case of processing image data by hardware.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus for processing input-image data into output-image data, the apparatus comprising:
a processor, including:
a plurality of image processing units, each one of the plurality of image processing units being operable to (i) detect a respective edge-gradient direction having a largest gradient of a pixel value and a respective edge direction orthogonal to the edge-gradient direction for each pixel of the input-image data, (ii) perform edge-enhancement processing on the input-image age data in the respective edge-gradient direction detected by that image processing unit, and (iii) perform smoothing processing on the input-image data in the respective edge direction detected by that image processing unit so that each one of the plurality of image processing units generates associated processed image data that is output by that image processing unit, and
an integration unit operable to integrate the associated processed image data output from each one of the plurality of image processing units to generate the output-image data,
wherein each one of the plurality of image processing units has respective characteristics set for its use with detecting the edge-gradient direction and the edge direction that are different than the respective characteristics set for any other of the plurality of image processing units.

2. The image processing apparatus according to claim 1, wherein each one of the plurality of image processing units includes:
an edge detection unit operable to detect the edge-gradient direction and the edge direction;
an edge-direction processing unit operable to perform smoothing processing on the input-image data in the edge direction for each pixel of the output-image data on the basis of a detection result of the edge detection unit to sequentially output pixel values corresponding to individual pixels of the output-image data; and
an edge-gradient direction processing unit operable to perform contour enhancement processing on the pixel value output from the edge-direction processing unit in the edge-gradient direction for each pixel of the output-image data on the basis of the detection result of the edge detection unit to sequentially output pixel values of the image data.

3. The image processing apparatus according to claim 2, wherein the edge detection unit detects the edge-gradient direction and the edge-direction by differentiating pixel values in a certain range with a pixel to be processed as center, and the plurality of image processing units have different differential operators set for use with differentiating the pixel values in the edge detection unit in order to have different characteristics set for use with detecting the edge-gradient direction and the edge direction.

4. The image processing apparatus according to claim 2, wherein the edge detection unit detects the edge-gradient direction and the edge-direction by differentiating pixel values in a certain range with a pixel to be processed as center, and the plurality of image processing units have different ranges set for the certain range in the edge detection unit in order to have different characteristics set for use with detecting the edge-gradient direction and the edge direction.

5. The image processing apparatus according to claim 4, wherein the setting of the different ranges is a setting of the number of samplings used for processing by down sampling the input-image data.

6. The image processing apparatus according to claim 2, wherein each one of the plurality of image processing units comprises:
a reliability calculation unit operable to detect reliabilities in the edge-gradient direction and in the edge direction; and
a blend unit operable to correct the pixel values output from the edge-gradient direction processing unit by the pixel values of the input-image data in accordance with the reliabilities detected by the reliability calculation unit.

7. The image processing apparatus according to claim 6, wherein the reliability calculation unit sets sampling points before and after a remarked pixel at regular intervals in the edge direction, obtains pixel values at the sampling points from the input-image data, and detects the reliability by comparing the pixel values.

8. The image processing apparatus according to claim 7, wherein the reliability calculation unit sets sampling points before and after the remarked pixel and the sampling points in the edge-gradient direction, respectively, and obtains pixel values at the sampling points by summing up the pixel values at the sampling points.

9. The image processing apparatus according to claim 6, wherein the reliability calculation unit calculates difference values of pixel values of the remarked pixel and adjacent pixels in a vertical direction and in a horizontal direction, and detects the reliability by comparing the difference values.

10. The image processing apparatus according to claim 1, wherein the integration unit sets a weighting coefficient of the image data output from each image processing unit in accordance with a ratio between a variance of gradients of pixel values in the edge direction and a variance of gradients of pixel values in the edge-gradient direction detected by the image processing unit, and adds the image data with weighting using the weighting coefficient to generate the output-image data.

11. A method of processing input-image data into output-image data, the method comprising:
using a processor to carry out the following:
performing a plurality of image processes, each one of the plurality of image processes including (i) detecting a respective edge-gradient direction having a largest gradient of a pixel value and a respective edge direction orthogonal to the edge-gradient direction for each pixel of the input-image data, (ii) performing edge-enhancement processing on the input-image data in the respective edge-gradient direction detected by that image process, and (iii) performing smoothing processing on the input-image data in the respective edge direction detected by that image process so that each one of the plurality of image processes produces associated processed image data, and
integrating the associated processed image data produced by each one of the plurality of image processes to generate the output-image data,
wherein each one of the plurality of image processes has respective characteristics set for its use with detecting the edge-gradient direction and the edge direction that are different than the respective characteristics set for any other of the plurality of image processes.

12. The method of processing input-image data into output-image data according to claim 11, wherein each one of the plurality of image processes includes:
edge detecting including detecting the edge-gradient direction and the edge direction;
edge-direction processing including performing smoothing processing on the input-image data in the edge direction for each pixel of the output-image data on the basis of a detection result of the edge detecting step to sequentially output pixel values corresponding to individual pixels of the output-image data; and
edge-gradient direction processing including performing contour enhancement processing on the pixel value output from the edge-direction processing step in the edge-gradient direction for each pixel of the output-image data on the basis of the detection result of the edge detecting step to sequentially output pixel values of the image data.

13. A computer-readable memory having recorded therein a computer program for performing a method of processing input-image data into output-image data, the method comprising:
performing a plurality of image processes, each one of the plurality of image processes including (i) detecting a respective edge-gradient direction having a largest gradient of a pixel value and a respective edge direction orthogonal to the edge-gradient direction for each pixel of the input-image data, (ii) performing edge-enhancement processing on the input-image data in the respective edge-gradient direction detected by that image process, and (iii) performing smoothing processing on the input-image data in the respective edge direction detected by that image process so that each one of the plurality of image processes produces associated processed image data; and
integrating the associated processed image data produced by each one of the plurality of image processes to generate the output-image data,
wherein each one of the plurality of image processes has respective characteristics set for its use with detecting the edge-gradient direction and the edge direction that are different than the respective characteristics set for any other of the plurality of image processes.

14. A computer-readable medium having recorded therein a program executable by a processor to perform a method for processing input-image data to output output-image data, the method comprising:
performing a plurality of image processes, each one of the plurality of image processes including (i) detecting a respective edge-gradient direction having a largest gradient of a pixel value and a respective edge direction orthogonal to the edge-gradient direction for each pixel of the input-image data, (ii) performing edge enhancement processing on the input-image data in the respective edge-gradient direction detected by that image process, and (iii) performing smoothing processing on the input-image data in the respective edge direction detected by that image process so that each one of the plurality of image processes produces associated processed image data; and
integrating the associated processed image data produced by each one of the plurality of image processes to generate the output-image data,
wherein each one of the plurality of image processes has respective characteristics set for its use with detecting the edge-gradient direction and the edge direction that are different than the respective characteristics set for any other of the plurality of image processes.

15. The image processing apparatus according to claim 1, further comprising:
an output operable to output the output-image data to a display means.

16. The method of processing input-image data to output-image data according to claim 11, further comprising:
outputting the output-image data to a display means.

* * * * *